J. C. BREINL.
VALVE.
APPLICATION FILED FEB. 8, 1917. RENEWED MAR. 2, 1920.

1,349,145.

Patented Aug. 10, 1920.

INVENTOR
J. C. BREINL
BY
F. M. Wright,
ATT'Y.

UNITED STATES PATENT OFFICE.

JOSEPH C. BREINL, OF PRAGUE, CZECHO-SLOVAKIA.

VALVE.

1,349,145.  Specification of Letters Patent.  Patented Aug. 10, 1920.

Original application filed May 24, 1916, Serial No. 99,648. Divided and this application filed February 8, 1917, Serial No. 147,331. Renewed March 2, 1920. Serial No. 362,680½.

*To all whom it may concern:*

Be it known that I, JOSEPH C. BREINL, a subject of the Emperor of Austria, residing at Prague, Czecho-Slovakia, have invented new and useful Improvements in Valves, of which the following is a specification.

The present invention relates to improvements in that class of valves which are raised from seats by the pressure of fluids flowing underneath the valve and raising them against a stop, and the primary object of the invention is the provision of a guide plate, which, fastened to a center bolt, and welded to the valve plate, assures to the latter a lateral rigidity, and, by welding at points on the marginal section between connecting arms, permits the lift of the valve plate to be sufficiently high without unduly straining the material, and also which, by being disposed between the valve plate and the stop plate, serves as a cushion to reduce the force of the impact at the end of the lifting motion.

The present application is a division of that filed by me May 24, 1916, Serial No. 99,648.

Figures 1, 7:
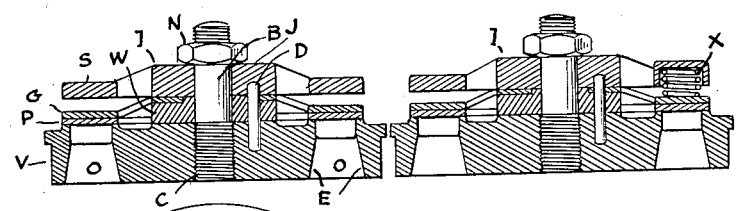
Figure 2:
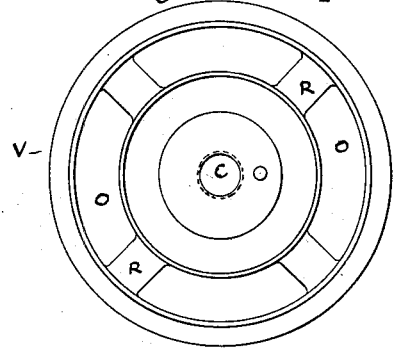
Figure 3:
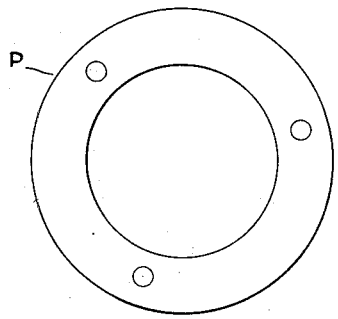
Figures 4, 6:
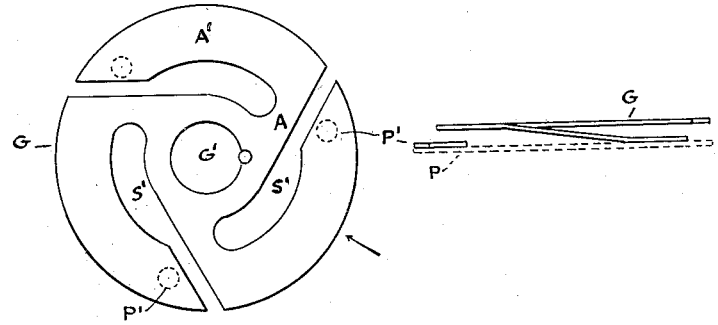
Figure 5:
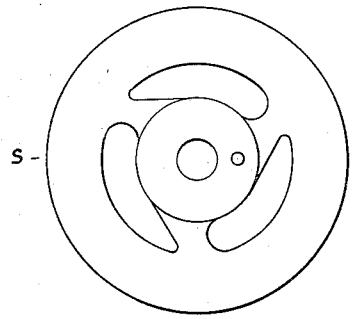

In the accompanying drawing, Figure 1 is a vertical section of one form of my invention; Figs. 2, 3, 4 and 5 are plan views of separate parts thereof; Fig. 6 is a side view, looking in the direction of arrow, of the parts shown in Fig. 4; Fig. 7 is a view similar to Fig. 1, of a modification of the invention.

On referring to the drawing, it will be seen that my improved valve 1 comprises a valve seat V, a valve plate P, a combined guide and cushion plate G, a stop plate S, all of which are circular, a bolt B screwed into the valve seat, a washer W on said bolt between the valve seat and the valve stop, and a nut N on said bolt. A dowel pin D, through the parts S, W and V, secures them against relative rotation. The valve seat V, of known form, has a series of uniformly arranged seat openings O and a small central opening C to receive the bolt B. The openings are separated from each other by ribs R. The lower portions of said openings flare downwardly as at E. Resting upon the valve seat is an annular sheet metal valve plate P, closing the openings O. The combined guide and cushion plate G, is formed with a small central opening G', to fit in a recess in the washer W. It is also formed with openings extending around the central opening G', and it is cut through at one end of each opening S', and thus there are formed arms A extending, from the central portion of the plate to its circumference, and portions A' of a discontinuous peripheral ring, each connected at one end to an arm A. These portions A' are connected at their free ends, as shown at P', to the ring P. This peripheral ring, which forms the outer portion of the guide, and cushion plate G, is cut so as to follow the curvature of the outer portion of the valve plate P. This arrangement permits the lift of the valve to be very great without undue strain upon the material bent by said lifting. The thickness of the arms A has to be proportioned according to the lift required. These arms are given a permanent bend out of the plane of the remainder of the plate, which provides a resilient connection between the periphery and the center of the guide plate, and in some cases enables the springs necessary for closing the valve to be dispensed with.

In the modification of the invention shown in Fig. 7, however, the necessary spring force to close the valve on its seat is obtained by means of additional coiled springs X pressing against the welding points, and contained in recesses in the stop plate and, if these coiled springs are strong enough, the said permanent bend of the guide plate naturally can be reduced or altogether dispensed with; otherwise the construction is the same as that shown in Fig. 1.

In the open position of the valve, the guide and cushion plate fits closely against the flat surface of the valve plate and serves to cushion the valve at the end of its lifting motion. Since it is important to very carefully center the valve plate with reference to the valve opening, and since the combined guide and cushion plate is made out of very thin material, the hub of said plate is, as before referred to centered in a recess of the lift washer W, and for the purpose of centering the guide and cushion plate still more accurately it may be welded to said washer.

The stop plate S which limits the rising movement of the valve is of cast iron or is punched out of sheet metal, and is otherwise formed similarly to plate G, except that it has a raised hub-like portion J.

I claim:—

1. A valve, comprising a valve seat, a valve plate, a stop plate, means connecting said valve seat and stop plate, and a cushioning guide plate of spring material comprising a central portion secured to the valve seat, a peripheral ring attached at spaced points only to the valve plate, and arms extending from the central portion of the guide plate and connected with said ring at points adjacent to its points of attachment to the valve plate, said ring being cut between said points of attachment and the adjacent arms, whereby parts of said ring disposed between the spaced points and the arms move toward and from the valve plate as it opens and closes and said guide plate insures a parallel opening movement and lateral rigidity of the valve.

2. A valve, comprising a valve seat, a valve plate, a stop plate, means connecting said valve seat and stop plate, a cushioning guide plate of spring material comprising a central portion secured to the valve seat, a peripheral ring attached at spaced points only to the valve plate, and arms extending from the central portion of the guide plate and connected with said ring at points adjacent to its points of attachment to the valve plate, said ring being cut between said points of attachment and the adjacent arms, whereby parts of said peripheral ring disposed between the spaced points and the arms are set out of the plane of the remainder to give said parts a spring tension tending to close the valve plate as said valve opens and closes and said guide plate insures a parallel opening movement and lateral rigidity of the valve.

3. A valve, comprising a valve seat, a valve plate, a stop plate, means connecting said valve seat and stop plate, a cushioning guide plate of spring material comprising a central portion secured to the valve seat, a peripheral ring attached at spaced points only to the valve plate, and arms extending from the central portion of the guide plate and connected with said ring at points adjacent to its points of attachment to the valve plate, said ring being cut between said points of attachment and the adjacent arms, whereby parts of said peripheral ring disposed between the spaced points and the arms move toward and from the valve plate as said valve opens and closes and said guide plate insures a parallel opening movement and lateral rigidity of the valve, and springs pressing against the cushioning guide plate.

J. C. BREINL.